(12) United States Patent
Lim

(10) Patent No.: US 9,705,634 B2
(45) Date of Patent: Jul. 11, 2017

(54) COMMUNICATION USERS PREDICTIVE PRODUCT

(71) Applicant: Applied Research Associates, Inc., Albuquerque, NM (US)

(72) Inventor: Laura Macy Lim, Garnet Valley, PA (US)

(73) Assignee: Applied Research Associates, Inc., Albuquerque, NM (US)

(*) Notice: Subject to any disclaimer, the term of this patent is extended or adjusted under 35 U.S.C. 154(b) by 99 days.

(21) Appl. No.: 14/586,347

(22) Filed: Dec. 30, 2014

(65) Prior Publication Data
US 2016/0183098 A1 Jun. 23, 2016

Related U.S. Application Data

(60) Provisional application No. 61/921,627, filed on Dec. 30, 2013.

(51) Int. Cl.
*H04B 7/185* (2006.01)
*H04K 3/00* (2006.01)
(Continued)

(52) U.S. Cl.
CPC ........... *H04K 3/22* (2013.01); *H04B 7/18517* (2013.01); *H04B 7/18534* (2013.01); *H04L 41/22* (2013.01); *H04L 67/20* (2013.01)

(58) Field of Classification Search
CPC ..... H04W 16/22; H04W 48/04; H04W 48/18; H04W 48/06; H04L 29/08; H04L 12/24; H04K 3/00

(Continued)

(56) References Cited

U.S. PATENT DOCUMENTS 6,011,951 A * 1/2000 King ............... H04B 7/195
455/13.2
7,127,272 B1 * 10/2006 Almaleh ............ H01Q 1/00
342/423

(Continued)

*Primary Examiner* — Dominic Rego
(74) *Attorney, Agent, or Firm* — Dinsmore & Shohl LLP; Monika L'Orsa Jaensson, Esq.

(57) ABSTRACT

The system of the present invention allows a user to select one or multiple SATCOM radio and antenna equipment types, select their current location(s) or a route and select the UHF SATCOM satellite for a multi-user communication network or architecture. The system presents an assessment of the level of performance of the selected system equipment and provides a capability to assess the impact of degrading factors, such as man-made interference (jamming) and natural phenomena (e.g. rain, clouds, ionospheric scintillation). This predictive assessment is a tailored result showing the phenomenology effects. Natural phenomenology like ionospheric scintillation, clouds, and precipitation, plus man-made phenomenologies like SATCOM jammers need to be differentiated by behavior characteristics and performance on a SATCOM frequency. If the system assessment determines the communication link is weak or ineffective based off the user's inputs, the application provides the ability to select alternative configurations, e.g. other radio and antenna equipment pairing and/or other satellite options or access times. The system of the present invention can be updated and modified as the satellite communication community and users identify new equipment and additional ionospheric scintillation data resources. Using satellite communication equipment (radio, antenna and satellite specifications) databases and near-real time external data, if available, allows the system of the present invention to generate an assessment tool that shows the quality of the communication overarching architecture.

13 Claims, 14 Drawing Sheets

(51) Int. Cl.
  *H04L 29/08* (2006.01)
  *H04L 12/24* (2006.01)
(58) Field of Classification Search
  USPC ........... 455/3.03, 12.1, 13.2, 98, 427, 404.1, 455/404.2, 456.1; 701/213; 244/158.1, 244/158.4, 158.6
  See application file for complete search history.

(56) References Cited

U.S. PATENT DOCUMENTS

| | | | | |
|---|---|---|---|---|
| 7,340,283 | B1* | 3/2008 | Melick | G01S 19/11 342/357.29 |
| 2003/0128159 | A1* | 7/2003 | de La Chapelle | H01Q 3/04 342/359 |
| 2003/0211829 | A1* | 11/2003 | Chapelle | H04B 7/18578 455/12.1 |
| 2005/0227710 | A1* | 10/2005 | Yamashita | H04W 36/12 455/456.1 |
| 2006/0030261 | A1* | 2/2006 | Taur | H04B 7/18519 455/12.1 |
| 2007/0063909 | A1* | 3/2007 | Fujita | H01Q 9/065 343/795 |
| 2008/0191952 | A1* | 8/2008 | Tokoro | C04B 38/06 343/753 |
| 2009/0217333 | A1* | 8/2009 | Young | H04N 7/173 725/109 |
| 2011/0122894 | A1* | 5/2011 | Gobara | G01S 19/29 370/479 |
| 2011/0250914 | A1* | 10/2011 | Arlotta | H04L 67/36 455/508 |
| 2012/0092138 | A1* | 4/2012 | Kaga | G06K 19/07758 340/10.51 |
| 2012/0303937 | A1* | 11/2012 | Chu | G06F 3/038 712/214 |
| 2013/0044035 | A1* | 2/2013 | Zhuang | H01Q 9/0428 343/770 |

* cited by examiner

COMMUNICATION USERS PREDICTIVE PRODUCT

BACKGROUND OF THE INVENTION

The system of the present invention provides means for planning satellite communications (SATCOM) among equipment located at one or more specific geographic locations, or along a route of locations. Specifically, the system of the present invention provides a means for selecting SATCOM transmission and reception equipment and locations, signal frequency and message bits, satellites, and time periods, to allow for effective communications, notwithstanding degrading interference sources, including natural and man-made phenomenology.

When commercial and military users of SATCOM equipment use SATCOM designed radios, antennas and associated satellites there is a need to better understand and evaluate the quality of communications pertaining to those equipment choices or pairings and the impacts that natural and man-made phenomenology's effects have on the SATCOM system and overarching communications architecture. Natural phenomenology like ionospheric scintillation, precipitation, and clouds, plus man-made phenomenologies like satellite communication jammers (including noise jammers, frequency hopping jammers and non-coherent Continuous Wave (CW) or tone jamming, multiple tone jamming, and in-band, band-limited full and partial band jammers) need to be differentiated by behavior characteristics and performance effects on a SATCOM frequency. Currently there are no systems available that provide commercial and military users the ability to assess the quality of communications pertaining to SATCOM equipment choices and pairings, and various degrading phenomenology effects, for multiple communication entities (e.g., airplanes, ships, stationary or moving units). By means of the present invention the user may evaluate the effects of phenomenology, for example, jamming or ionospheric scintillation, on communication among identified equipment in terms of bit error rate (BER) or report error rate (RER), or both.

Military and scientific research has shown that geosynchronous located SATCOM satellites transmitting and receiving either voice or data are highly susceptible to interference or denial due to the aforementioned phenomenologies. The present invention relates to a system that allows a user to select one or more entities, including radio and antenna equipment types, current locations or one or more routes during an operation of interest, and one or more SATCOM satellite(s) for their communications. The system of the present invention will identify the overall effect on performance of this integrated communication construct, including any areas or times in which any segment of the communications network of a scenario has degraded performance. The user can also select one or more degrading interference sources (e.g. jamming, ionospheric scintillation, clouds or rain) and assess the potential impact on performance based on different levels of interference. As an example, when assessing the impact of ionospheric scintillation on communications, using ultra high frequency (UHF) satellite communication equipment (radio, antenna and satellite specifications) data and based on the entities' geographic locations, the software will choose the closest near-real time ionospheric scintillation data source or sources and generate a predictive quality assessment of the communication link. This predictive assessment is a tailored result showing the effects ionospheric scintillation may have on the communication signals, based partially upon the intended signal frequency and message bits. If the assessment determines the communication link is weak or ineffective the application provides the user the ability to select alternative actions, e.g. other radio and antenna equipment pairing and/or other satellite options or access times.

The system of the present invention can be updated and modified as the satellite communication community and users improve existing equipment, develop new equipment and functionality, and as additional man-made and natural phenomena characteristics that interfere with satellite communications are defined.

GENERAL DESCRIPTION OF THE INVENTION

Generally, the present invention regards a system useful in planning satellite 11 communications among one or more specific equipment locations. The system includes a database 23, a user interface 21 for gathering information regarding a proposed scenario, and a computer server 22 programmed to determine the effect of degrading interference sources on communications signals in the scenario, and when unacceptable allow the user to determine what equipment, satellites 11, time windows and/or signal qualities may result in better SATCOM signals.

The database includes information regarding communications equipment 1, including, as shown in FIG. 9, SATCOM radios 10 and antennas 12, as well as satellites 11. Specifically, the database includes information about a multitude of SATCOM radios a plurality of radios 10, wherein the database information for each radio includes the radio name, its min-max frequency range, gain or gain/temperature, transmitter power, and internal system losses. Likewise, the database includes information about a multitude of SATCOM antennas 12, wherein the database information for each antenna includes the antenna name, its min-max frequency range, transmitter power, internal system losses, and transmitter power gain. The database further includes information regarding satellites 11 available for SATCOM communications, including each satellite name, its satellite number, and altitude, longitude, field of view and EIRP of the satellite.

At the user interface of the present invention, a user inputs geographic locations of communications equipment, by latitude, longitude and amplitude (a "waypoint"), and the type of communications equipment at the waypoint; the intended frequency of message transmission and reception at each waypoint; one or more degrading interference sources, by type; and one or more satellites from the database, for communication with the communications equipment.

The user interface then transmits the information input by the user to a computer server, which is programmed to determine the satellites that are available for communication with the communications equipment input or selected by the user, and transmit a list thereof to the user for selection at the user interface. Furthermore, the computer server calculates the effect of the degrading interference source on the transmission of messages and information between the communications equipment and one of the selected satellites, and automatically generates and transmits to the user interface for graphic display the communications equipment locations, the satellite locations, and the effect of the degrading interference source calculated.

The system of the present invention allows a user to plan and evaluate a communication scenario, e.g. military mission, to provide communication effectiveness assessment for a duration of time based on satellite and equipment pairing selection.

DESCRIPTION OF THE DRAWINGS

FIG. 12 shows a schematic diagram of an embodiment of the system of the disclosed technology.

DETAILED DESCRIPTION

Figure 1:
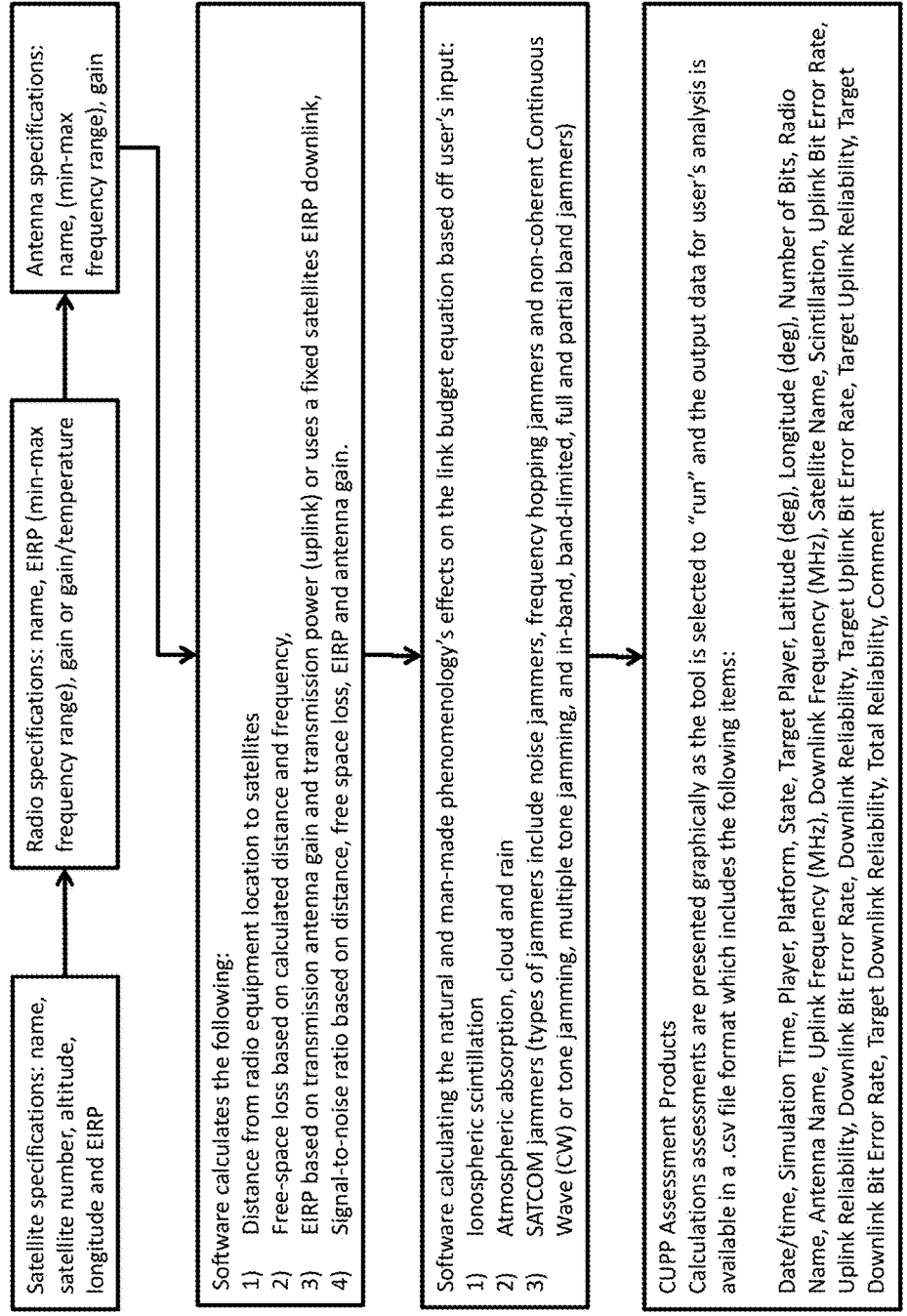
FIG. 1 is a process flowchart for embodiments of the present invention.

The present invention, an embodiment of which is described in the flowchart of FIG. 1, regards a system that allows users to assess the quality of SATCOM communication links between their respective communication equipment, using communication satellites, and the impacts that man-made interference, like jamming, and natural phenomenology, like ionospheric scintillation, clouds and precipitation may have on the communication links.

A graphical user interface (GUI) serves as the user interface to gather information from the user, and provide the assessment of communication quality under selected adverse conditions and locations and potential degrading effects. The system of the present invention in some embodiments allows a user to select an index or parameter value that defines the level or intensity of the adverse conditions for predictive assessments, which may include the ability to manually input the value or have it fetched from a third party database.

The system comprises a database having information regarding communications equipment and satellites. Specifically, data for radios available for satellite communications may include name, transmitter power, equivalent or effective isotropically radiated power (EIRP), min-max frequency range, internal system losses, and gain or gain/temperature; similarly, data for antennas available for satellite communications may include name, transmitter power, internal system losses, min-max frequency range and transmitter antenna gain. The database is further populated with information regarding satellites available for satellite communications, including name, satellite number, altitude, longitude, field of view and EIRP. Other database elements may include default values for conditions adverse to signal communication, such as $S_4$ for ionospheric scintillation, power (watts) for SATCOM jammers, cloud type and resulting attenuation (dB) for cloud interference, attenuation (dB) for the impact of rain on signal communications, and a default level of intensity on the reported error rate caused by adverse conditions to define the communications link subjected to such conditions as acceptable or unacceptable. The database may be easily updated by the developers and users, without modifications to the underlying application.

Figure 5:
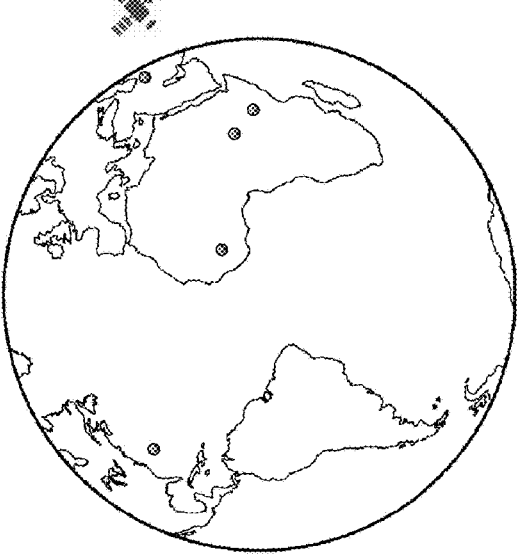
FIG. 5 shows an embodiment of the user interface of the present invention with multiple entities and waypoints. The user interface has pulldown menus for satellites, radio systems, and antennas; uplink and downlink frequencies can be manually entered or the user can use a slider bar to input frequencies.
Figure 6A:
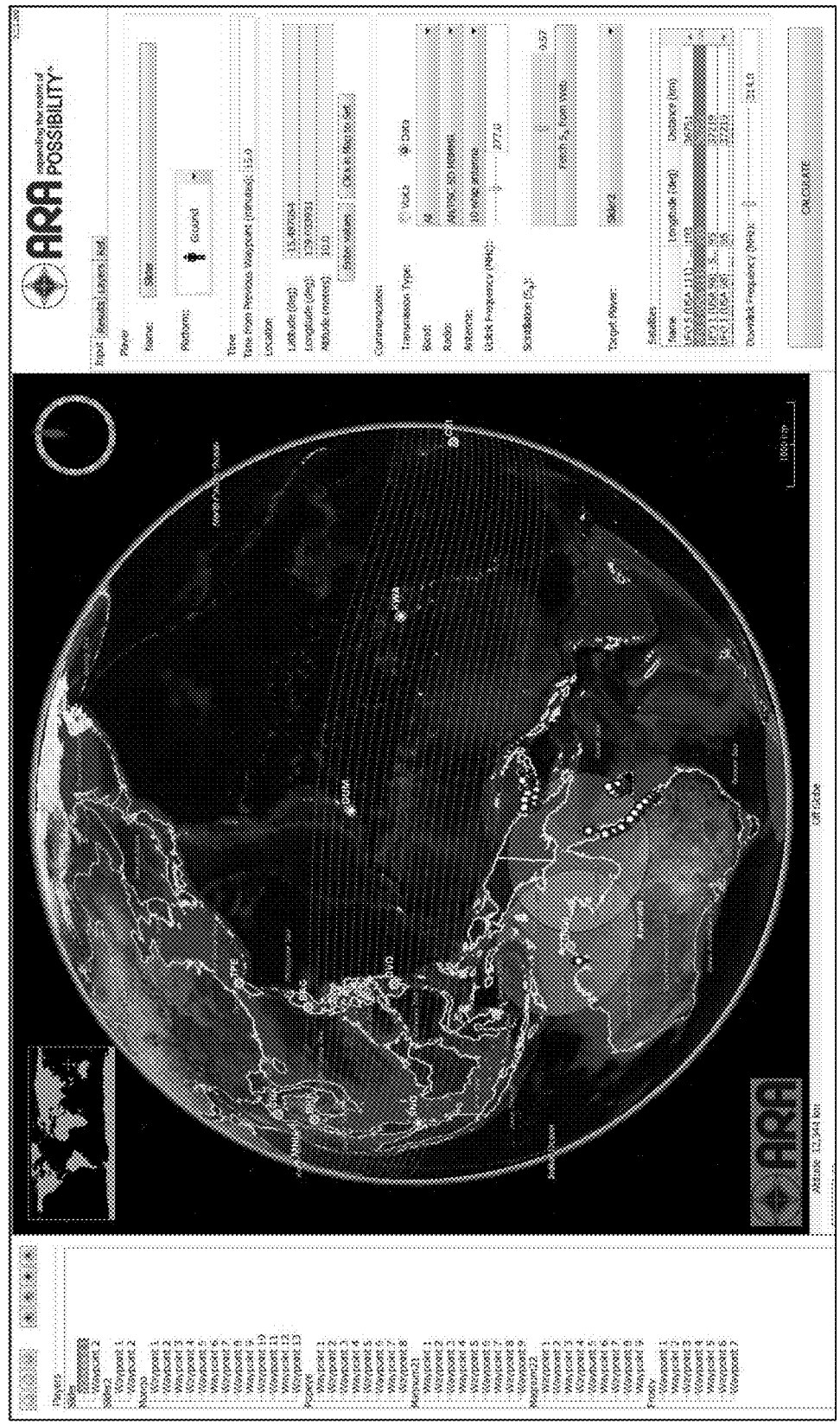
FIGS. 6A, 6B and 6C show an embodiment of the user interface of the present invention, with different views of the displayed globe, having a purple band on the globe representing the geomagnetic belt where ionospheric scintillation is most likely to cause interference with satellite communications.
Figure 6B:
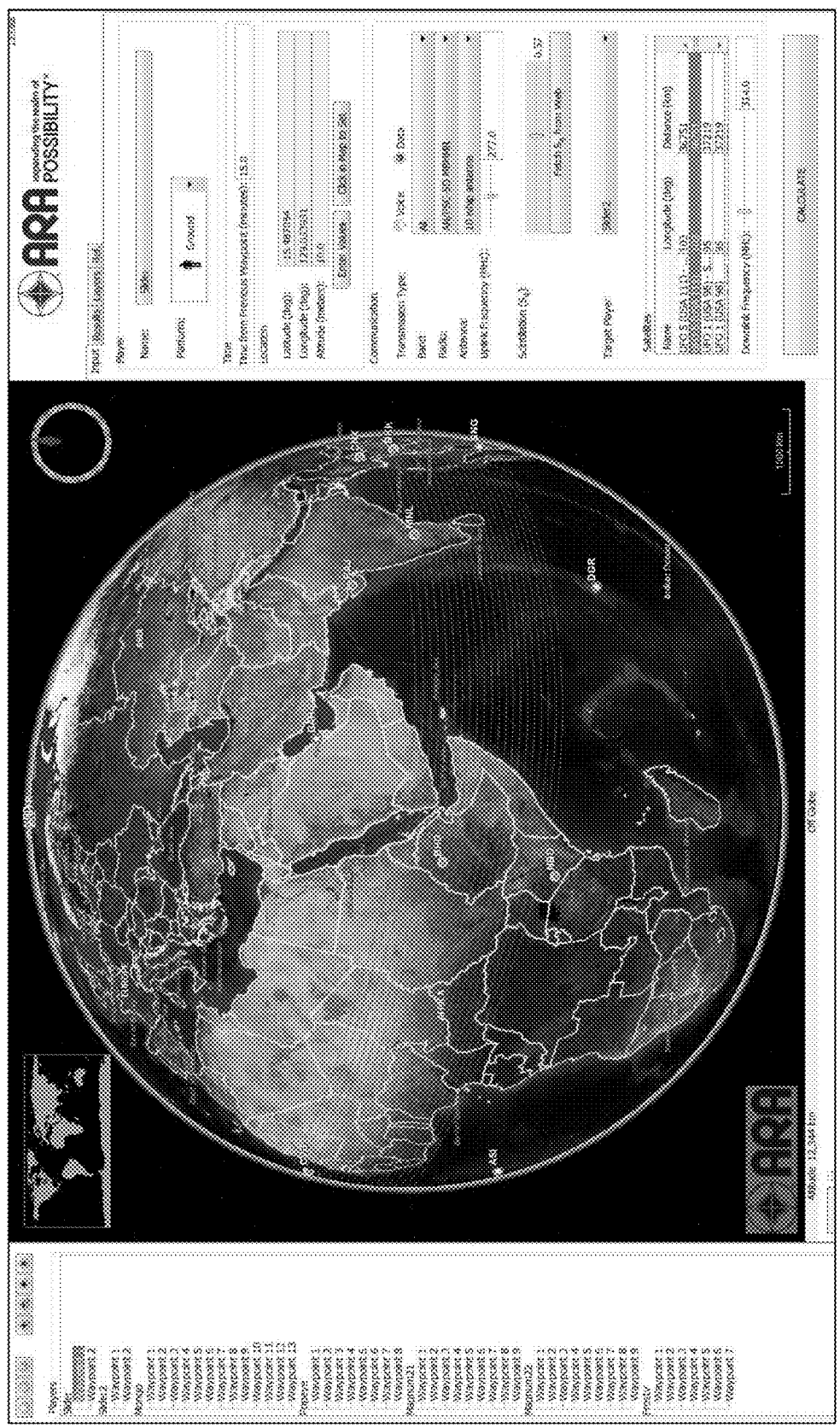
Figure 6C:
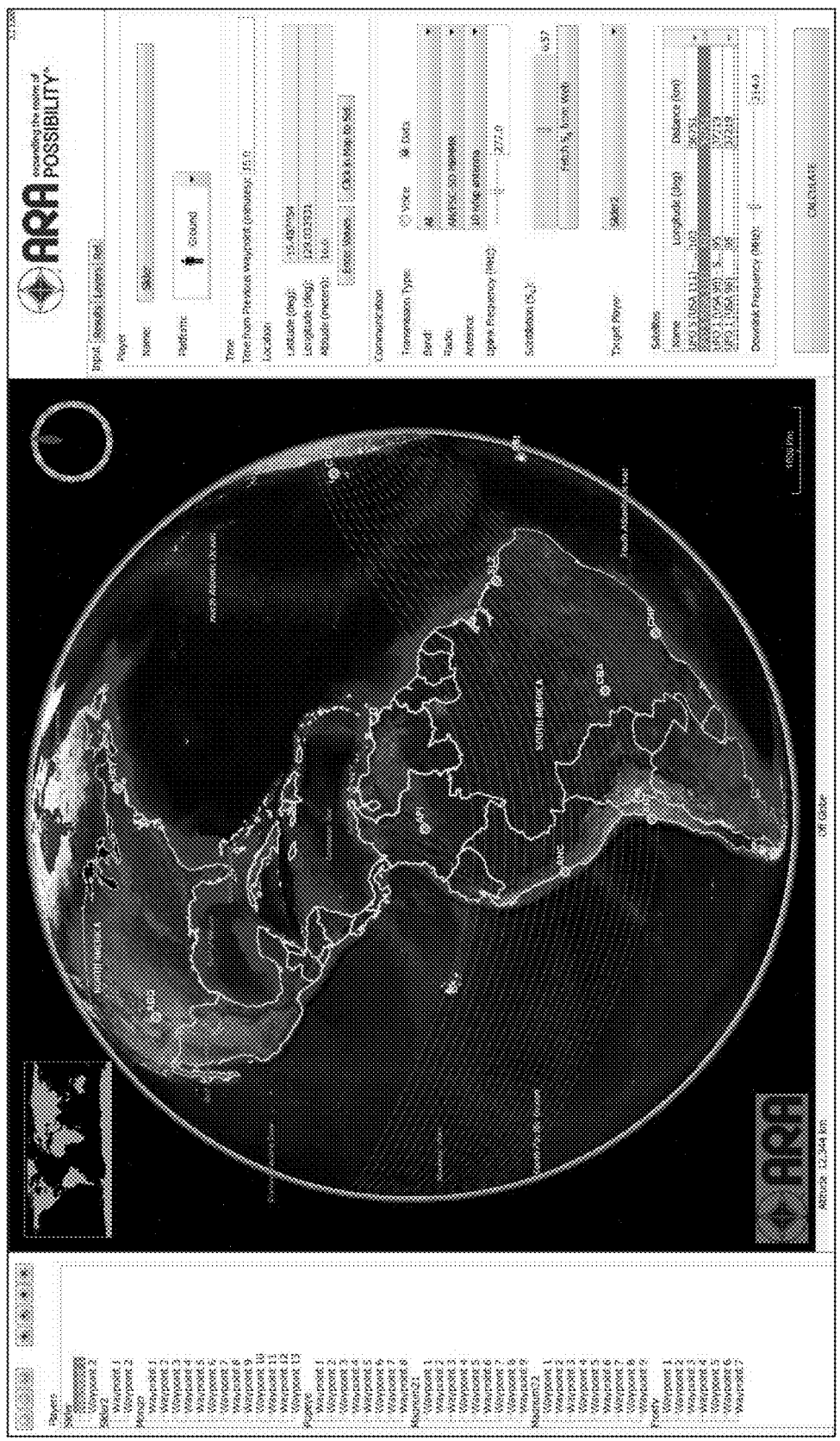
Figure 7:
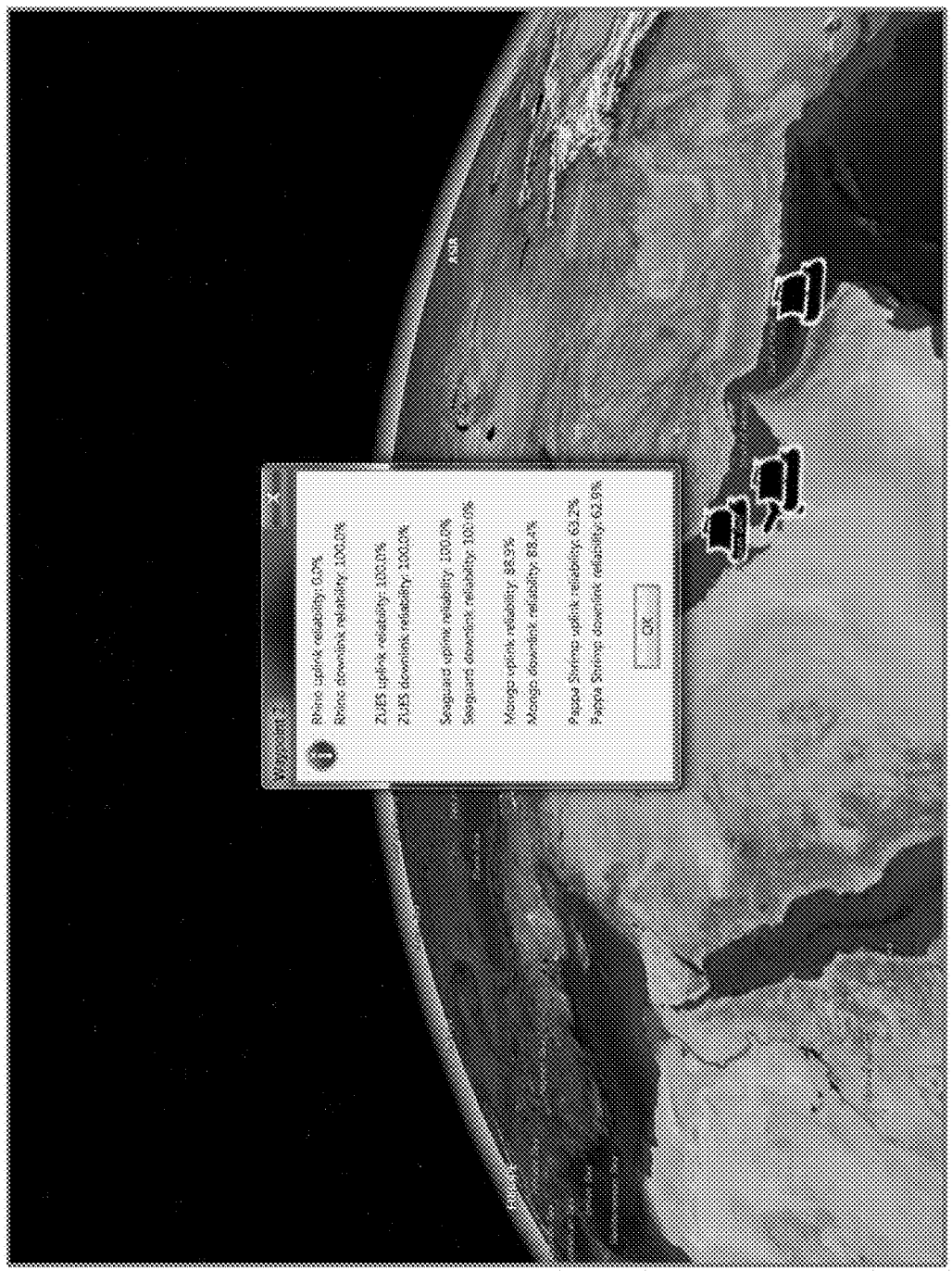
FIG. 7 shows an embodiment of the user interface of the present invention, whereby the system of the present invention has generated and transmitted to the user interface communication prediction based on equipment pairing and satellite selection for multiple entities.

The system of the present invention further comprises a user interface displayed electronically. As shown in FIG. 5, by means of this interface, the user may input, or select on a map or globe displayed on the interface, one or more geographic locations or waypoints of communications equipment (latitude, longitude and altitude) or one or more routes of interest (multiple locations) for a communication scenario with a time duration. Location information may be entered by values, or by means of a pointer on the GUI world map. In some embodiments the user may select from a menu of icons (e.g. aircraft for air, ships for sea, and people or buildings for land, etc.) to represent the entities' communication systems.

Furthermore, the user at this interface selects the communications equipment at each location, or enters data regarding any equipment not identified in the database, and the intended frequency, bit rate and message packet size, of message transmission and reception. The system further provides that the user, at the user interface, may input or select one or more times or windows of time for communication. In some embodiments the user may input or selects a level of intensity on the reported error rate from adverse conditions to be deemed unacceptable communications; in some embodiments the system has a default level of intensity of adverse conditions, as defined in the database.

At the user interface the user also selects a satellite from a plurality of satellites in the database that are available based upon the designated equipment location and each satellite's field of view (the processor determines whether equipment coordinates are within a satellite's field of view to determine what satellites are available), the having determined which satellites are available based upon the locations of entities specified by the user and the field of view of each satellite.

As shown in FIG. 5, the system of the present invention allows the user, at the GUI 21, to input or select one or more degrading interference sources (ionospheric scintillation, jammers, and cloud or rain interference) and data related thereto (e.g., manually input an ionospheric scintillation $S_4$ value 0.0 to 1.0, jammers power value in watts, cloud interference or cloud type in dB, and rain rate or forecast precipitation type in dB), or can retrieve the information real-time from a third party database 24 (e.g., fetches the scintillation value from a website). The data input or retrieved is geographically specific to the communications link between the equipment location and the selected satellites 11, may be time specific (in the past, present or future), and when the user enters a time period in the past or in the future, will gather the data relating to such time period and in some embodiments other time periods near the time period of interest. Additional information may be input by the user regarding these sources, including for jammers a jammer name (e.g. Bad guy #1), the location of the jammer, and frequency of the jamming signal and transmission power rating of jammer. Through calculations hereinafter described, the impact of equipment selection, signal properties, location and adverse conditions will determine the quality of communication.

Figure 8:
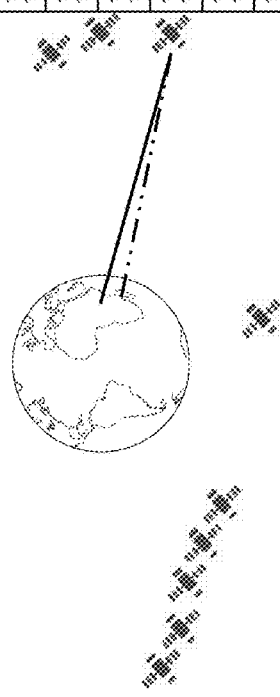
FIG. 8 shows an embodiment of the user interface of the present invention, whereby the system of the present invention has generated and transmitted to the user interface communication prediction having a high communication interference from scintillation with the satellite selected by the user (see broken line), and further showing other satellites based upon their respective fields of view available for communication among the selected communication equipment, allowing a user to select another satellite for communication with the previously designated communication equipment. The figure further shows that the scenario built in the system of the present invention can display the analysis in the 'Results' tab, and can be saved as a .csv file for further analysis.
Figure 9:
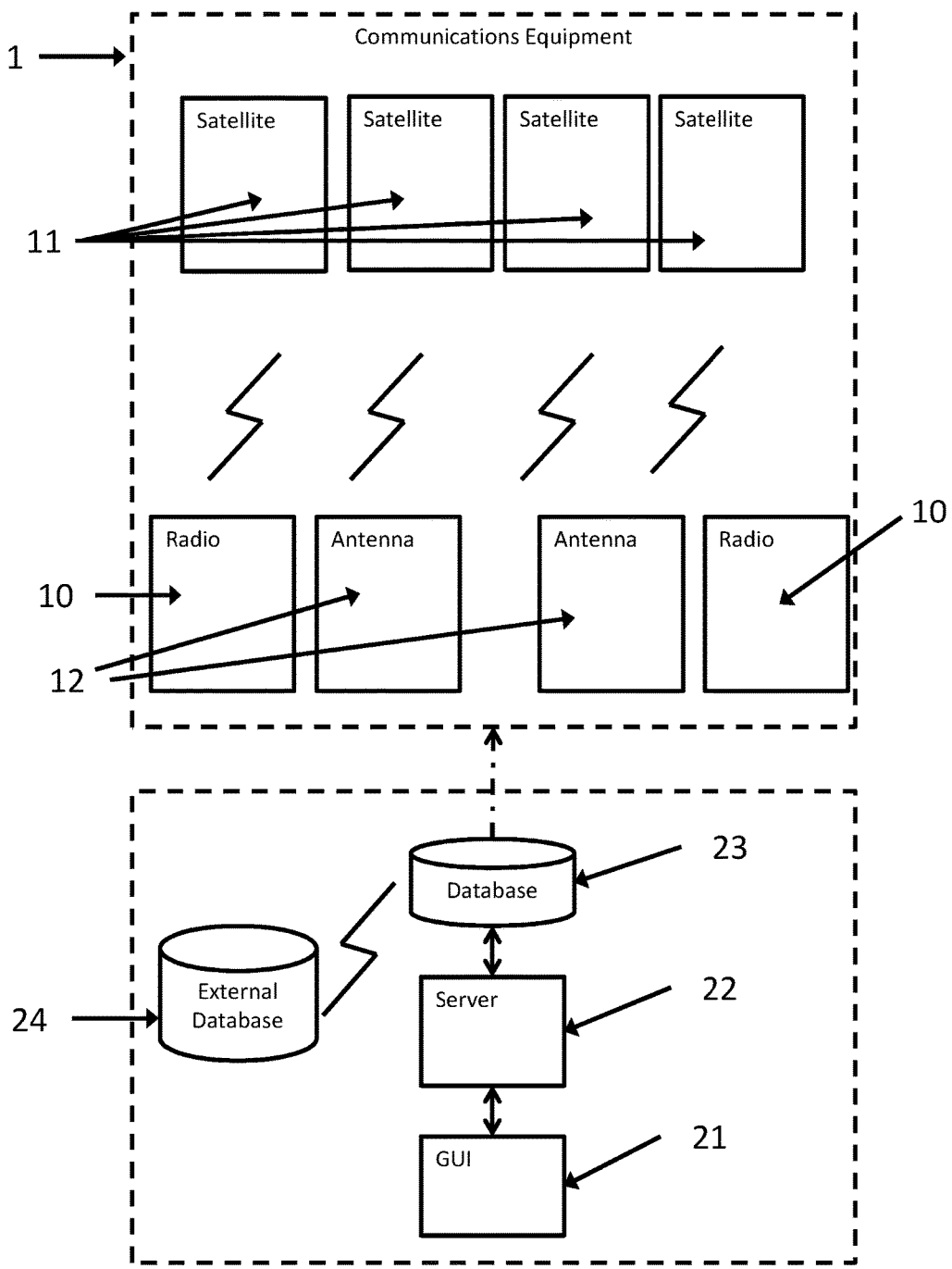
FIG. 9 shows an embodiment of the user interface of the present invention, wherein the system of the present invention has generated on a graphic display the location of all of the satellites available in the system's database; when the user selects a location on the Earth, the system of the present invention removes from the display the satellites that are not in the location's field of view.
Figure 10A:
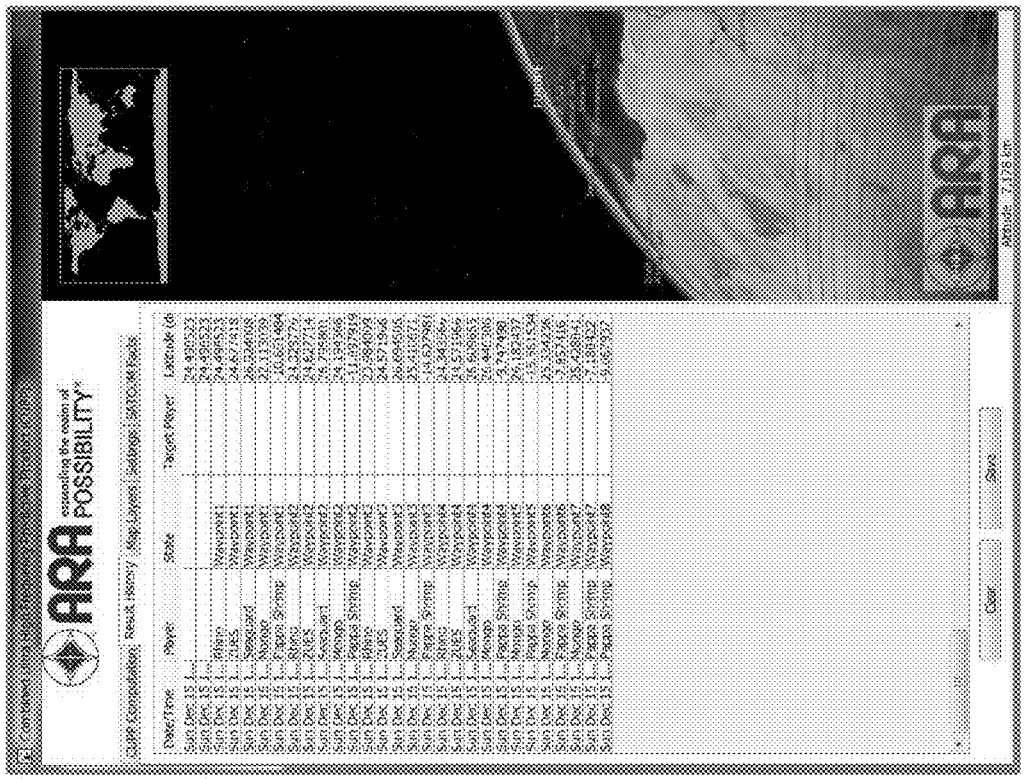
FIGS. 10A and 10B show embodiments of the user interface of the present invention, wherein the system of the present invention generates and displays, in table format and on a graphic display, the results of multiple entities in a single scenario.
Figure 10B:
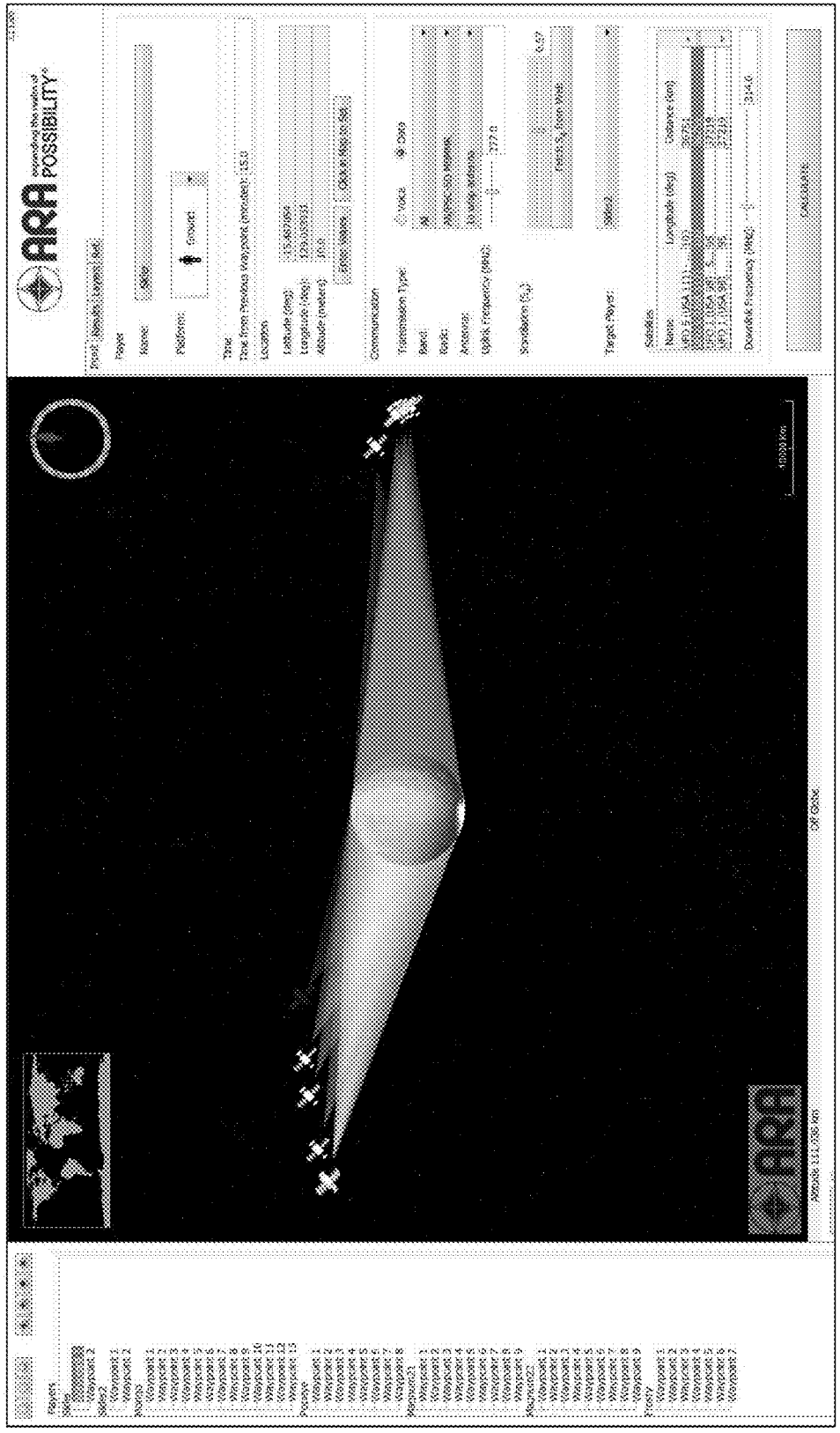
Figure 11:
FIG. 11 shows an embodiment of the user interface of the present invention, showing Darwin, Australia, as the center of a 1,000 km circle, wherein the system is "fetching" the $S_4$ value for scintillation from the Australian Government, Bureau of Meteorology website http://www.ips.gov.au/World_Data_Centre/1/11; this value is converted by the system of the present invention to the UHF frequency $S_4$ value. The circles on the graphic display of the figure represent the near-real time range of the "fetched" and converted $S_4$ data near Australia.

The information input or selected by the user at the user interface is transmitted to a computer server of the present invention; any information input by the user regarding communication equipment not previously within the database is transmitted to the database for future users. The computer server is programmed to determine satellites that are available for communication with the communications equipment input or selected by the user, based upon the designated waypoint(s) of the equipment and the satellite's field of view, and presents a list, and/or a graphical representation, thereof to the user for selection at the user interface. Furthermore, the server is programmed to retrieve geographically specific, real-time data regarding conditions adverse to communications signals (man-made or natural) from one or more third party databases, relating to the geographic area of interest (specifically, the vector from the equipment location to the selected satellite) based upon the designated waypoint(s) of the communications equipment and the satellite field of view, and using the data calculates the effect of one or more adverse conditions on the transmission of messages and information between the communications equipment and the selected satellite, as hereinafter described. As shown in FIG. 8, the user may thereby evaluate, for example, ionospheric scintillation effects on transmission of messages between identified equipment and a selected satellite, at a specific location and time period, in terms of bit error rate (BER) or report error rate (RER), each of which are displayed in a results dialog, and can be exported into a comma separated value (CSV) or other formatted file such as a graph or chart.

The system of the present invention automatically generates and transmits to the user interface 21 for graphic and/or textual display, and for download, the communications equipment locations, the satellite locations, and the calculated effect of the adverse conditions. The effect of the adverse conditions may be reported as acceptable or unacceptable, the calculated error rates (e.g., bit error rate or report error rate), over time for the specified time duration, or by color on the graphic display.

In some embodiments, when the effect is determined to be unacceptable, the processor of the system automatically calculates the effect of the selected adverse conditions for communications using other satellites that have a field of view within the location of the communications equipment, or automatically calculates the effect on other equipment and other frequencies for message transmission, and generates and transmits to the user interface for graphic display different available satellites for communication and different communications equipment, or different frequencies for message transmission, by means of which the effect of the selected adverse conditions on the communications links is acceptable. The application further identifies other satellites available to the SATCOM equipment and allows the user to select another satellite for performance assessment to evaluate which satellite(s) provide better communication performance for the selected equipment and the designated location(s). Alternatively or in addition, the system of the present invention may make these selections and calculations independent of user input, by processing scenarios for all available equipment, signal specifications and satellites or by determining the weakness or interference in the degraded signals and providing equipment, satellites or signal specifications that avoid such weakness or interference, confirming by processing scenarios using such suggested equipment, satellites or signal specifications, and outputs the results thereof or recommendations regarding modifications to the system network (selection of equipment, signal frequency or selection of satellite).

When a route of interest is specified by a user, the application will run a predictive assessment and show the assessed BER or RER for individual timesteps (e.g., one hour intervals) throughout the the specified time duration (similar to a video playback option). In such an embodiment, as well as in a stationary location assessment, the GUI playback may display colored lines between equipment pairings to show the communication path, wherein the line color represents the quality of the communication based on BER or RER. For example, green may represent the BER or RER exceeds the minimum specification threshold, and a red line of communication represent the BER or RER that does not meet the threshold; a yellow line may also be used when the communication BER or RER is near the threshold.

In some embodiments, by means of the user interface a user may select or input additional locations for communications equipment, modify times of communication, modify frequency of transmission and reception of messages, select different available satellites for communication, and the user interface will transmit sais input or selected information to the computer server. The computer server will retrieve data regarding the adverse conditions from said third party database, calculate the effect of the adverse conditions on the communications links of the modified scenario, and generate and transmit the equipment and satellite locations and the effect of the selected adverse conditions to the user interface.

Further, the system of the present invention may display all of the satellites in the system database, by location and field of view; when one or more specific waypoints are inputted into the system of the present invention by the user, the system calculates those satellites that are available based upon the designated location(s) and the satellites' respective fields of view, and transmits the information to the user interface. The user may then select which communications satellite the system shall use to generate results, by point-and-click on a map or globe shown on the GUI, by means of a drop-down menu, or by other similar means.

In some embodiments the application integrates at the GUI a color contour plot of the earth's geomagnetic field in the equatorial region on the world map. Through use of the present invention, a user may plan a communication event, e.g. operational mission, to provide communication effectiveness assessment for a duration of time based on selected equipment pairings and the movement of the multiple transmitting and receiving communication systems.

The system performance determination is based on a Link Budget Equation parameterization. Once the information is input into or retrieved by the processor of the system of the present invention, the software assesses the information and performs the following functions: (1) calculating distance and vector from equipment location to each satellite, based upon their respective positions; (2) calculating free-space loss based on calculated distance and frequency; and (3) calculating EIRP based on transmission antenna gain and transmission power (uplink), or use a fixed satellite EIRP (downlink). The invention is capable of accounting for other natural and man-made factors that can affect communication performance, specifically ionospheric scintillation, atmospheric/cloud absorption, rain attenuation and jamming. The invention may provide default values in the database that define each affect selected by the user, and also the ability for the user to select or input values, or to import or fetch appropriate values from other data sources. For the example of ionospheric scintillation effects, the additional functions include: (1) calculating Nakagami m parameter based on scintillation index $S_4$, and (2) calculating scintillation loss based on the Nakagami m parameter. Preferably the Nakagami m parameter is determined based upon a database of values derived from the Nakagami m distribution shown in FIG. 2. Each phenomenon aforementioned will have its own specific effect on the communication performance and will be calculated as hereinafter described for each performance degradation source.

From these calculations the system of the present invention uses the link budget equation to output the reliability of the link based upon the calculated BER or RER.

An example of a .csv output file generated by the processor of the system of the parent invention, assessing the communications link based upon user input and adverse conditions, are listed in Table 1. The contents of the output file can be modified or customized, and saved as a .csv file or converted into a graph or chart.

TABLE 1

| Date/Time | Simulation Time | Player | Platform |
|---|---|---|---|
| State | Target Player | Latitude (deg) | Longitude (deg) |
| Number of Bits | Radio Name | Antenna Name | Uplink Frequency (MHz) |
| Downlink Frequency (MHz) | Satellite Name | Scintillation | Uplink Bit Error Rate |
| Uplink Reliability | Downlink Bit Error Rate | Downlink Reliability | Target Uplink Bit Error Rate |

TABLE 1-continued

| Target Uplink Reliability | Target Downlink Bit Error Rate | Target Downlink Reliability | Total Reliability |
|---|---|---|---|
| Comment | | | |

An example of a .csv output for a specific scenario is shown in Table 2.

TABLE 2

| Date/Time | Simulation Time | Player | Platform |
|---|---|---|---|
| Mon Jan 27 15:35:32 MST 2014 | 0 | Slider | Ground |
| State | Target Player | Latitude (deg) | Longitude (deg) |
| Waypoint 1 | Mongo | 29.942125 | 48.576779 |
| Number of Bits | Radio Name | Antenna Name | Uplink Frequency (MHz) |
| 9600 | AN/PSC-5D MBMMR | 10 whip antenna | 277 |
| Downlink Frequency (MHz) | Satellite Name | Scintillation | Uplink Bit Error Rate |
| 314 | UFO 11 (USA 174) | 0.404 | 8.59E−07 |
| Uplink Reliability | Downlink Bit Error Rate | Downlink Reliability | Target Uplink Bit Error Rate |
| 0.991785498 | 3.92E−07 | 0.99624668 | 1.80E−07 |
| Target Uplink Reliability | Target Downlink Bit Error Rate | Target Downlink Reliability | Total Reliability |
| 0.998276257 | 3.83E−07 | | |
| Comment | | | |

If the user creates a time history of way points, the application also has the option to create an animated "flyout" of the performance of each link in the communication system. At the GUI simulated satellite link vectors can show the path of the link between the equipment and the satellite, and may be color coded red/yellow/green to highlight the level of expected performance. This animation function allows the user to get a quick-look, comprehensive overview of the performance of the system for an entire mission.

Performance Determination

To perform this analysis for a SATCOM receiver, the system of the present invention first calculates the received power link budget for both the uplink and downlink of the communication transmission, by the Link Budget Equation, expressed in decibel form, given by:

$$P_{Rec} = \text{EIRP} - L_{FS} - L_m - L_{Environ} + G_{Rec} - L_{Rec}$$

where:
  $P_{Rec}$=received power (dBW)
  EIRP=effective isotropically radiated power transmitted or equivalent isotropically radiated power (use EIRP of equipment for uplink, calculated as hereinafter provided; satellite EIRP for downlink)
  $L_{FS}$=free space path loss (dB)
  $L_m$=miscellaneous losses (fading margin, body loss, polarization mismatch, antenna pointing offsets) (dB); in some embodiments this is set at a value of 1 dB
  $L_{Environ}$=loss due to environmental effect (atmospheric absorption, rain, ionospheric scintillation fading)
  $G_{rec}$=receiver antenna gain (dBi)
  $L_{Rec}$=receiver losses (coax cable, attenuation, connectors . . . ) (dB); in some embodiments this is a fixed value of 0.0 for small ground systems; 0.5 for larger systems, where cable may extend a significant distance (e.g., tanks); and 1.0 for airplanes And EIRP for uplink is calculated as follows:

$$EIRP = P_{Tr} + G_{Tr} - L_{Tr}$$

where:
$P_{Tr}$=transmitter power
$G_{Tr}$=transmitter antenna gain
$L_{Tr}$=internal system losses of the transmitter (coax cable, connectors, etc.)

The EIRP performance specification for the satellite transmitter is provided as the total value of the system, while the EIRP for the ground and airborne systems are calculated from the individual component specifications.

Since the free space path loss is a function of the distance from the receiver to the transmitter (slant path) and the frequency, the free-space loss calculation uses the following equation:

$$L_{FS} = \left(\frac{4\pi d f}{c}\right)^2$$

where:
d=slant path
f=frequency
c=speed of light

The uplink and downlink frequency is a manual input by the user which is used to calculate $L_{FS}$ separately for each link.

The factors $L_m$, $L_{Tr}$, and $L_{Rec}$ are equipment configuration specific. For the miscellaneous losses, $L_m$, typical UHF SATCOM antennas are circular polarized and eliminate the terrestrial problem of polarization mismatch. The polarization is always changing and the antenna is built for this, so no additional loss for this is necessary. In some embodiments the miscellaneous losses default to a value of 1 dB; alternatively, the system at the user interface may permit the user to input this value.

With knowledge of the performance of communications equipment of a particular system and the bit rate, a link budget analysis is used to derive a statistical characterization of the quality of a digital link given by the ratio of the energy per bit to the system noise ($E_b/N_o$). The equation for this ratio is given by:

$$\frac{E_b}{N_0} = P_{Rec}/((k \cdot T_S) \cdot R)$$

where:
k=Boltzmann constant
$T_S$=Receiver system temperature
R=Data rate in bits per second (bps)

The key metric of interest for characterizing the communication performance is the Bit Error Rate (BER), which is determined from ($E_b/N_o$) as hereinafter described. This, in turn, is translated into a Report or Packet Error Rate (RER). The RER is calculated directly from the BER by:

$$RER = 1 - (1-BER)^N$$

where N is the length in bits of a message packet; in some embodiments a default 32 bit packet is used, which may be adjusted by input from the user at the user interface. The BER is be derived from the ratio of the energy per bit to the system noise.

Replacing $P_{rec}$ with the Link Budget Equation for the ground receiver in decibel form, this becomes:

$$\frac{E_b}{N_0}(dB) = EIRP - L_{FS} - L_m - L_{Environ} + G_{Rec} - L_{Rec} - 10\log_{10}T_S - 10\log_{10}R - 10\log_{10}(k)(dB)$$

The system temperature ($T_S$) for the ground and airborne systems is set to 300° K by default, but can be set by the user at the GUI.

For the uplink channels, the gain and system temperature of the satellites is typically not known explicitly, but the standard performance metric used for the satellites is $G_{Rec}/T_s$, which takes into consideration the system losses. So the BER equation for uplink channels to the satellite becomes:

$$\frac{E_b}{N_0}(dB) = P_{Tr} - L_{Tr} + G_{Tr} - L_{FS} - L_m - L_{Environ} + G_{Rec}/T_S - 10\log_{10}R - 10\log_{10}(k)(dB)$$

The BER equation to calculate the impact of jammers is referenced later in this disclosure.

The calculation of the BER is dependent on the statistical distribution that characterizes the signal amplitude variation and is related to the ratio of the energy per bit to the system noise ($E_b/N_o$). For nominally disturbed signals ($S_4$=0), there is still a potential of a random bit error from additive white Gaussian noise (AWGN), and this distribution is described as an AWGN channel, and is applied to estimate the performance for the baseline systems with no interference. In the absence of special coding or other transmission factors, theoretical AWGN channel performance of a modem using shaped offset quadrature phase shift keying has a BER that can be expressed in closed form as:

$$BER = Q\left(\sqrt{\frac{2E_b}{N_o}}\right)$$

where Q(x) is the standard normal cumulative distribution function and is essentially identical to the complementary error function (erfc).

$$Q(x) = \frac{1}{\sqrt{2\pi}} \int_x^\infty \exp\left(\frac{-u^2}{2}\right) du = \frac{1}{2}\operatorname{erfc}(x/\sqrt{2})$$

The equation for calculating the AWGN BER becomes:

$$BER(E_b/N_0)_{AWGN} = \tfrac{1}{2}\operatorname{erfc}(\sqrt{E_b/N_0})$$

where $E_b/N_0$ is in engineering units, not dB.

Performance Degradation Effects

Ionospheric Scintillation

Disturbances in the ionosphere cause rapid variations, or scintillation, in the signal strength of radio waves passing through the ionosphere. These effects have the largest impact of UHF communications channels. The $S_4$ metric is the standard metric for measuring the intensity or strength of the ionospheric scintillation. When scintillation is selected as the adverse conditions, the calculations ($L_{Environ}$) are based upon (a) the Rician K Factor, calculated based on the calculated Nakagami m parameter; (b) the BER, calculated based on the signal to noise ratio and the Rician K factor; and (c) the reliability of communications calculated based on the BER. Field measurements of ionospheric scintillation effects have found that the amplitude variation can be well described by a Nakagami-m distribution, where m is related to the scintillation metric, $S_4$, $$S_4 = \sqrt{\frac{\langle I^2 \rangle - \langle I \rangle^2}{\langle I \rangle^2}}$$

Where I is the amplitude of the signal strength and $S_4$ has been found to be related to m $$S_4 = \frac{1}{\sqrt{m \text{ value}}}$$

Figure 2:
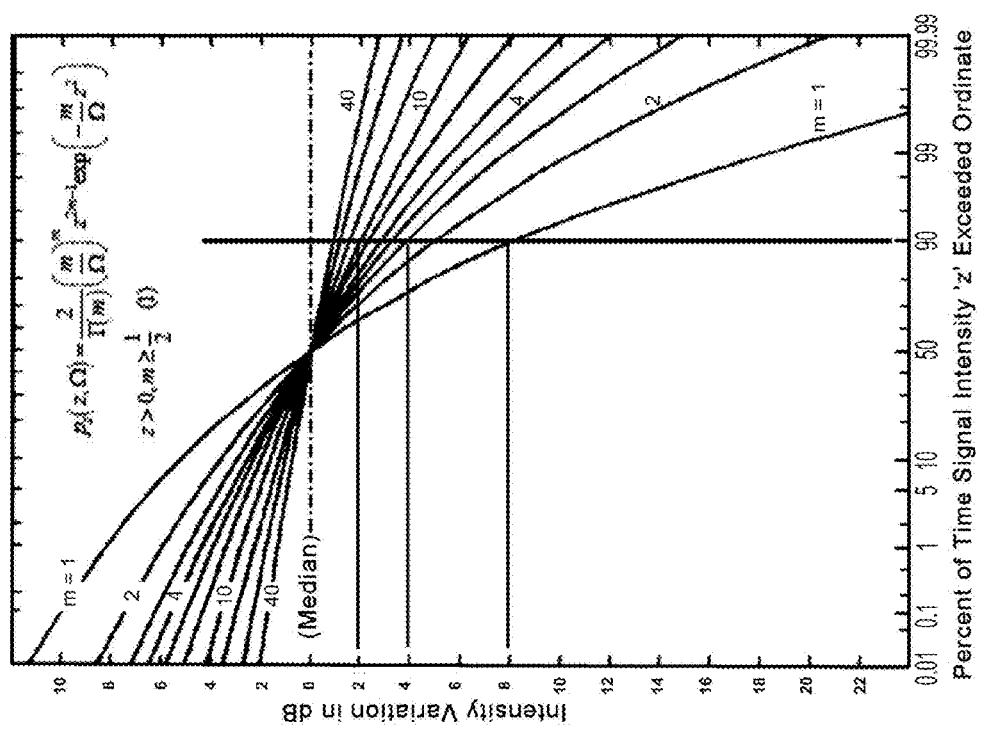
FIG. 2 is a graph of cumulative form of Nakagami-m Distribution, useful in the processes of the present invention.

The relationship between the m value and an equivalent fade value was determined from the Nakagami-m cumulative distribution relationship shown in FIG. 2 using the 90$^{th}$ percentile value and determining the dB fade value corresponding to a particulate m value. Using the m value derived from the $S_4$ metric input by the user, the processor of the system of the present invention determines an equivalent fade value, and this is input to computing the $L_{Environ}$ factor in the Link Budget Equation to calculate the received power and the ($E_b/N_o$).

For strong scattering ($S_4=1$, $m=1$), the amplitude distribution reduces to the Rayleigh Distribution and the BER calculation becomes:

$$BER(E_b/N_0)_{RAYLEIGH} = \frac{1}{2}\left(1 - \sqrt{\frac{E_b/N_0}{1 + E_b/N_0}}\right)$$

Between the AWGN and Rayleigh Distribution conditions, the amplitude probability distribution can best be described by the Rice (or Rician) Distribution which basically models the net ratio between the signal propagated along the line connecting transmitter and receiver (specular signal) and the signal scattered due to the effects of varying electron densities in the ionosphere. Rice distributions rely upon that ratio, usually abbreviated with the Greek letter, kappa (κ), and are related to the Nakagami m-value via algebraic equations. The equation for the determination of the BER for the Rice case is given by:

$$BER(E_b/N_0)_{RICE} = \frac{1}{2}\text{erfc}\left(\sqrt{\frac{(\kappa + e)E_b/N_0}{\kappa + e + E_b/N_0}}\right)$$

$$\kappa = \sqrt{m}\sqrt{m-1} + m - 1; m \geq 1$$

The system of the present invention calculates the BER using the AWGN equation (when $S_4=0$), the Rayleigh equation (when $S_4=1$) or the Ricean equation (when $S_4$ is between 0 and 1)

Ionospheric Scintillation Resources:

When "fetching" scintillation index values ($S_4$) to aggregate into CUPP the following websites are samples of data sources for ionospheric scintillation values:

Australian Government, Bureau of Meteorology, Ionospheric Scintillation by location
http://www.ips.gov.au/Satellite/1/1
http://www.ips.gov.au/World_Data_Centre/1/11

Space Environment Technologies, L-Band and UHF Scintillation
http://sol.spacenvironment.net/~ionops/global scintillation.html Istituto Nazionale di Geofisica e Vulcanologia-Rome, electronic space weather upper atmosphere
http://www.eswua.ingv.it/ingv/home.php?res=1024

Brazil, Instituto Nacional de Pesquisas Espaciais
http://www.inpe.br/scintec/realtimeLisn.php US National Geophysical Data Center
http://www.ngdc.noaa.gov/stp/iono/FIRST.html When "fetching" $S_4$ values, it is important to know which frequency they apply to, since the level of scintillation effects varies with frequency. Currently scientific data collection of ionospheric scintillation values are collected by measuring the amplitude of GPS L1 signal then determining delays in the reception of the signal. L1 is 1575.42 MHz and UHF is 200-400 MHz. For the "fetch" scenario, CUPP uses the L1 frequency $S_4$ value and mathematically recalculates $S_4$ value for the selected system values. To convert the L1 frequency $S_4$ value provided at a higher frequency of 1.5 GHz (GPS frequency) to the UHF 200-400 MHz (SATCOM) frequency, the system uses the following equation:

$$S_4\text{ForUHF} = 0.3092 * \log(S_4\text{ForGPS}) + 1.1924$$

If ($S_4$ForUHF>1), then the system defaults $S_4$ForUHF to 1.

Atmospheric and Cloud Absorption

The tropospheric atmosphere causes some absorption of radio wave used in SATCOM systems which is caused by the basic atmospheric constituents (air and water vapor). Clouds in the atmosphere add another absorption factor. Although both atmospheric and cloud absorption are relatively negligible (usually less than 1 dB), the current invention will allow for including these effects in the system performance assessment. The techniques for calculating these effects are derived from recommendations for the International Telecommunications Union P Series publications for Radio Propagation.

Since the atmospheric absorption is highly dependent on the specific link situation (path length, temperature, humidity, aerosol content), the system of the present invention allows the user to select and expected absorption value between 0 and 1.0 dB that is added to the total $L_{Environ}$ value in the Link Budget Equation.

Figure 3:
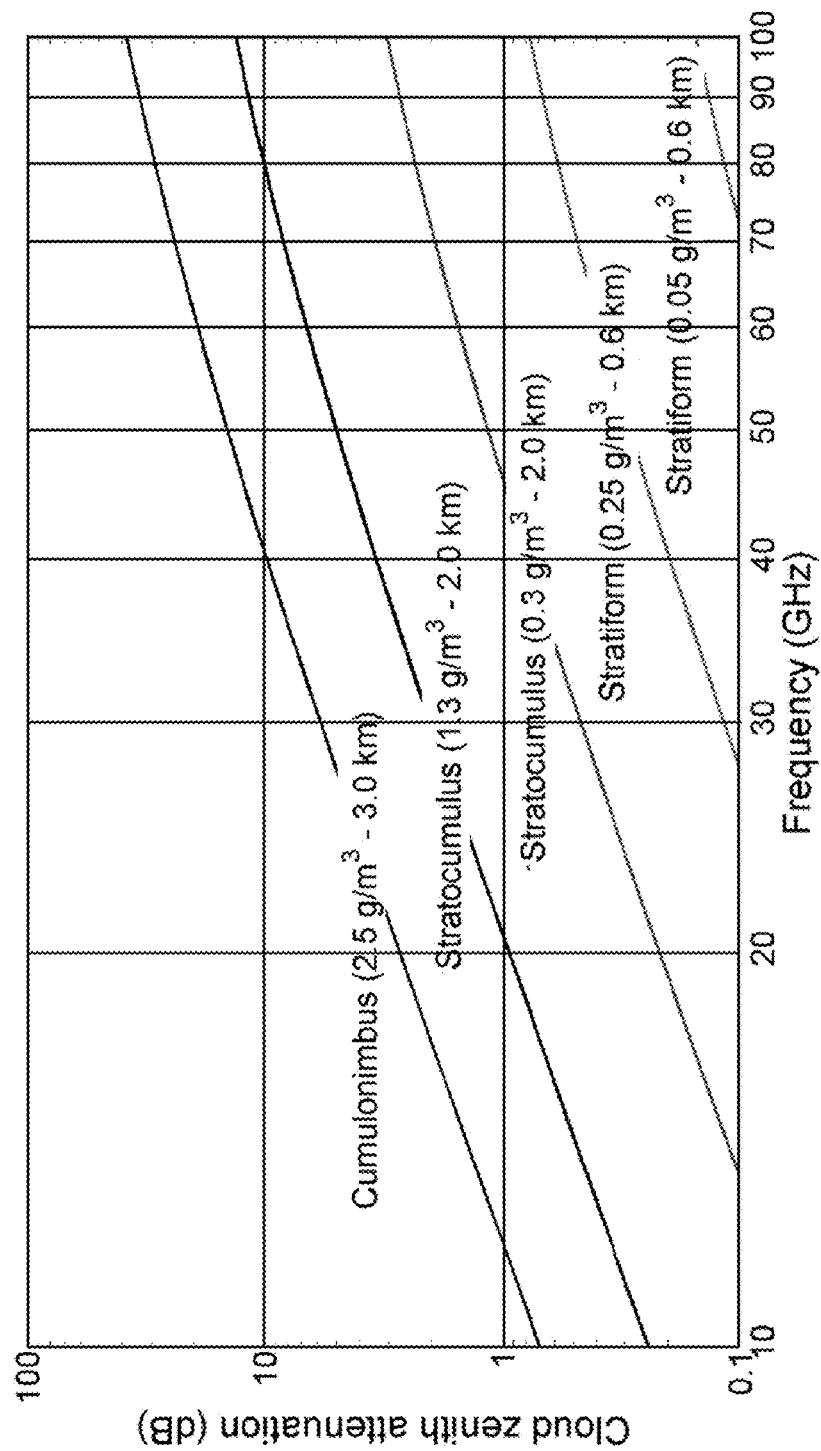
FIG. 3 is a graph showing cloud absorption of radio signals based on cloud type over a range of frequencies.

The water aerosols in clouds can have a somewhat larger absorption effect, particularly at higher frequencies (above 10 GHz). FIG. 3 is derived from the ITU publication algorithms for "typical" cloud types. These values have been converted into categorical options that user can select based on actual observations or forecast weather predictions and the frequency of the system. The appropriate loss value is added to the $L_{Environ}$ factor included in the Link Budget Equation and used to determine system performance.

Rain Attenuation

Figure 4:
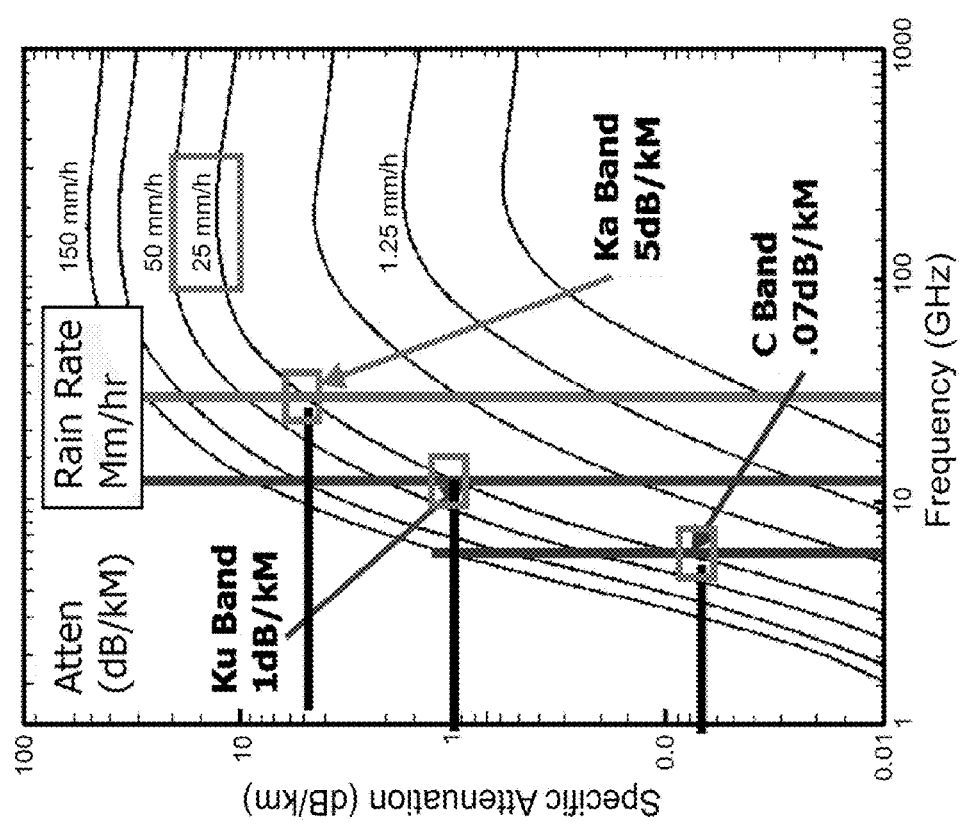
FIG. 4 is a graph showing attenuation of signals for varying rain rates over a range of frequencies.

Although rain has negligible effects on X-band frequencies and below, rain has a larger effect on radio wave propagation at the higher frequencies of the Ku and Ka bands. The attenuation is directly related to the rain rate and the path length through the rain. FIG. 4 illustrates this attenuation for different wavelengths and rain rates based on the ITU-R algorithms.

The current invention allows the user to select an expected rain rate and path length through the precipitation for assessment. If the user does not enter a path length, the invention will calculate a default path length based the location of the transmitter/receiver and satellite and a climatological estimate of rain layers for the appropriate locations.

The specific attenuation $\gamma_R$ (dB/km) is obtained from the rain rate R (mm/h) using the power-law relationship:

$$\gamma_R = kR^\alpha$$

Values for the coefficients k and $\gamma$ are determined as functions of frequency, f (GHz), in the range from 1 to 1,000 GHz, from the following equations, which have been developed from curve-fitting to power-law coefficients derived from scattering calculations. These parameters are provided in the publications ITU-R P-838.8, Specific attenuation model for rain for use in prediction methods. The $\gamma_R$ (dB/km) is multiplied by the estimated path length to determine the total attenuation effect that is added to the $L_{Environ}$ in the Link Budget Equation.

Satellite Communication Jammer

Traditional SATCOM jamming is a simple band-limited noise (barrage jamming or denial jamming). The purpose is to create an interference signal into the communications frequency of the actual (desired) signal causing the desired communications at the receiver to be immersed in unusable input, or noise. Jamming is successful when the jamming signal denies the usability of the communication transmission. The noise jammer can be a Line-of-Sight jammer, close enough to the intended receiver antenna to cause an effect, or it can be an uplink jammer intended to flood a satellite's transponder receiver with noise, thereby corrupting the input signal that is to be re-transmitted. In digital communications, the usability is denied when the error rate of the transmission cannot be compensated by error correction. Successful jamming attacks require that the jammer power is roughly equal to the signal power at the receiver. Assessment of a noise SATCOM jammer in the system of the present invention only considers Line of Sight jammers that are attempting to degrade the received signal of a SATCOM user, There are three criteria that must be present for a SATCOM jammer to be considered effective.

1) The SATCOM jammer must be in the footprint of the satellite being used to transmit SATCOM communications;
2) The jammer must be transmitting interference on the same frequency as the receiver signals;
3) The jammer must be transmitting at a greater signal strength than the receiver's expected input signal ($P_{Rec}$).

The system of the present invention allows a user to input a jammer name (e.g. Bad guy #1), the location of the jammer, and frequency of the jamming signal and transmission power rating of jammer system, J. The system determines if the three criteria have been met for each receiver entity input in a scenario and, if all three have been met for a receiver, the system generates and transmits to the GUI a downlink reliability of 0% and in the remarks column identifies the jammer by name. For scenarios with multiple waypoints, the jamming assessment is made for each waypoint of each entity affected.

The processor of the present invention uses the following formula to determine the BER associated with a SATCOM jammer (jammers only effect downlink communications):

$$\frac{E_b}{N_0} = P_{Rec} / ((k \cdot T_S + P_j) \cdot R)$$

Where:
$P_{Rec}$—calculated signal power at the receiver using the standard Link Budget Equation given above with all anticipated environmental degradations.

$P_j$—jammer output power at the receiver, given by:

$$P_j = J \left( \frac{4\pi Df}{c} \right)^2$$

J—jammer radiated power
D—distance from jammer to receiver user (calculated by CUPP based on jammer and receiver/user location
f—jammer frequency
c—speed of light The ($E_b/N_o$) valued is applied to the AWGN distribution to determine a BER for each receiver. An assessment of the performance is made relative to the established specification threshold for the systems in use.

The system of the present invention may be used to run calculations on communications links for past assessment, current operations, or predictive assessments. The system of the present invention may be developed as a flexible and extensible software design architecture that allows for easy updating of underlying entity databases or addition of new effects modules or plug-ins without major changes in the basic application design or operation.

The invention claimed is:

1. A system useful in planning satellite communications, the system comprising:
    communications equipment, the communications equipment comprising a plurality of radios, antennas, and satellites, wherein each radio and each antenna is positioned at one or more waypoints;
    a database, the database comprising equipment data for the system communications equipment, wherein the equipment data comprises:
        radio specific data for each of the plurality of system radios, the radio specific data comprising: radio type, frequency range, gain, transmitter power, and internal system losses;
        antenna specific data for each of the plurality of system antennas, the antenna specific data comprising: antenna type, frequency range, transmitter power, internal system losses, and transmitter power gain, and
        satellite specific data for each of the plurality of system satellites, the satellite specific data comprising: satellite type, an assigned satellite number, altitude, longitude, field of view and Effective Isotopically Radiated Power (EIRP);
    a graphical user interface (GUI) displayed electronically, by means of which a user inputs scenario information to the system, wherein the scenario information comprises:
        selection of equipment data for at least one system radio and at least one system antenna,
        geographic data regarding the waypoints for each of the selected system radio(s) and system antenna(s),
        values for an intended frequency of a message to be transmitted by the system,
        selection of one or more degrading interference sources, by type, and
        selection of equipment data for one or more system satellites, calculated by a computer server to be available for communication with the selected system radio(s) and system antenna(s), based upon the input geographic waypoint data for each or the selected system radio(s) and system antenna(s);
    wherein the GUI transmits the scenario information to the computer server;

the computer server, wherein the computer server is programmed to:

calculate from the satellite specific data the satellites that are available for communication with the selected system radio(s) and antenna(s), based upon the input geographic waypoint data for each selected system radio(s) and system antenna(s) and the location of the satellite;

calculate the geographic area of interest about the radio and antenna waypoints;

transmit to the GUI an identification of the available satellites, for selection by the user;

retrieve information real-time regarding the selected degrading interference source(s) in the geographic area of interest, from an external database selected by the computer server;

calculate the effect of the selected degrading interference source(s) on the transmission of messages at the selected frequency between the waypoints of the selected system radio(s) and antenna(s) and the location of the selected satellite(s); and generate and transmit to the GUI for graphic display the selected system radio(s) and antenna(s) at their respective waypoints, the selected satellite(s) at their respective locations, and the calculated effect of the selected degrading interference source(s).

2. The system of claim 1, wherein the degrading interference sources are one or more of ionospheric scintillation, jammers, cloud cover, and precipitation.

3. The system of claim 2, wherein the user inputs by means of the GUI one or more values for one or more of the selected degrading interference sources.

4. The system of claim 3, wherein the GUI allows the user to input a level of intensity of the degrading interference source determined by the system not to be acceptable, and the computer processor is programmed to use the user defined input level in determining whether the communication link is acceptable.

5. The system of claim 2, wherein the computer server is further programmed to:

determine whether the calculated effect of the selected degrading interference source(s) on the communications link is acceptable based upon a predetermined value, calculate a second effect of the degrading interference source in the calculated geographical area of interest on any of: other satellites calculated by the computer server to be available for communication with the selected radio(s) and antenna(s); other radio(s) and antenna(s) in the database, at one or more waypoints of the selected radio(s) and antenna(s); and the selected radio(s) and antenna(s) using a second message frequency;

determine whether the second calculated effect of the degrading interference source in the geographical area(s) of interest is acceptable; and generate and transmit to the GUI for graphic display any other satellites, other radio(s) or antenna(s), or other frequencies, wherein the second calculated effect of the degrading interference source in the geographical area(s) of interest is acceptable.

6. The system of claim 5, wherein the computer server is further programmed to determine one or more contributing causes of a communications link not determined to be acceptable, and based upon such determination of contributing causes, identifies one or more satellites, radios, antennas, or frequencies that are likely to avoid such contributing causes, and transmits to the GUI equipment data for such identified communications equipment or values for such frequencies.

7. The system of claim 1, wherein the scenario information further comprises: a plurality of waypoints for each selected radio and antenna; and a time period for communication.

8. The system of claim 1, wherein the GUI displays at least the satellites of the system determined by the computer server to be available for communication with the selected radio(s) and antenna(s), and received from the computer server, as a graphical depiction at the satellite altitude and longitude.

9. The system of claim 1, wherein the database further comprises default values for calculating the effect of degrading interference sources, the default values selected from the group consisting of: ionospheric scintillation S4 values, satellite communication jammer power values, cloud types and resulting attenuation, rain rate and resulting attenuation, and combinations thereof, and the computer server uses the default values in calculating the effect of the degrading interference source in a geographic area of interest when data from a third party database is not available.

10. The system of claim 1, wherein the GUI displays a map by means of which a user inputs the waypoints for the selected radios and antennas, and by means of which the user selects the satellite(s).

11. The system of claim 1, wherein the GUI receives data for radios and antennas, transmits the received data to the computer processor, and the computer processor is programmed to add the received data to the database.

12. The system of claim 1, wherein the GUI further receives data regarding a time period of interest for communication, transmits the time period data to the computer processor, and wherein the computer processor is programmed to retrieve information associated with such time period of interest and relating to degrading interference in the geographic area of interest from the external database.

13. The system of claim 1, wherein the output of the processor, displayed on the GUI, comprises an identification of each link as being determined acceptable or not determined acceptable and the computer processor is programmed to calculate a report error rate, over time for the specified time duration.

* * * * *